United States Patent [19]

Berg et al.

[11] Patent Number: 4,934,658
[45] Date of Patent: * Jun. 19, 1990

[54] LOCKING MECHANISM FOR EXTENDIBLE TELESCOPING TUBULAR MEMBERS

[76] Inventors: Marvin Berg, 1785 Lois Dr.; Bruce Grachek, 1800 Hillview Rd., both of New Brighton, Minn. 55112

[*] Notice: The portion of the term of this patent subsequent to Mar. 25, 2003 has been disclaimed.

[21] Appl. No.: 819,854

[22] Filed: Jan. 10, 1986

Related U.S. Application Data

[63] Continuation of Ser. No. 635,574, Jul. 30, 1984, Pat. No. 4,577,837.

[51] Int. Cl.⁵ .................. A47G 27/04; F16B 7/10; F16D 1/00
[52] U.S. Cl. .................. 254/212; 248/408; 403/108; 403/330
[58] Field of Search .............. 254/200, 209, 211, 212; 403/108, 325, 330; 248/188.5, 408, 409

[56] References Cited

U.S. PATENT DOCUMENTS

| | | |
|---|---|---|
| 213,226 | 3/1879 | McDermott . |
| 321,101 | 6/1885 | Graef . |
| 451,285 | 4/1891 | Windlund . |
| 475,273 | 5/1892 | Farren . |
| 487,544 | 12/1892 | Simon . |
| 493,111 | 3/1893 | Parsons . |
| 691,050 | 1/1902 | Dronne . |
| 1,027,914 | 5/1912 | Seybold . |
| 1,045,358 | 11/1912 | Aragall . |
| 1,534,759 | 4/1925 | Betterley . |
| 1,726,372 | 3/1927 | Stoll . |
| 2,108,506 | 2/1983 | Owens . |
| 2,124,842 | 7/1938 | Zierold et al. . |
| 2,160,134 | 5/1939 | Fanning . |
| 2,605,987 | 8/1952 | Brown et al. . |
| 2,682,414 | 6/1954 | Richardson . |
| 3,207,474 | 9/1965 | Silva . |
| 3,374,023 | 3/1968 | Hill et al. . |
| 3,441,252 | 4/1969 | Koppelmans . |
| 3,572,800 | 3/1971 | Graziano . |
| 3,692,278 | 9/1972 | Payson . |
| 3,693,936 | 9/1972 | Payson . |
| 3,752,440 | 8/1973 | Ream . |
| 3,791,624 | 2/1974 | Payson . |
| 3,866,964 | 2/1975 | Prater . |
| 3,917,225 | 11/1975 | Payson . |
| 4,076,213 | 2/1978 | Payson . |
| 4,230,302 | 10/1980 | Crain, Jr. .................. 254/212 |

Primary Examiner—John M. Jillions
Attorney, Agent, or Firm—Jack M. Wiseman

[57] ABSTRACT

A locking mechanism for extendible telescoping tubular members formed with radial, axially aligned openings. The locking mechanism comprises a hollow housing that surrounds the exterior wall of the outer tubular member. The housing is adapted for movement in the axial direction of the telescoping tubular members along the exterior wall of the outer tubular member. Disposed within the housing is at least one spring loaded lever that pivots about a fulcrum in the housing. Fixed to the opposite end portions of the lever, respectively, are oppositely directed plungers. When the radial openings of the telescoping tubular members are in register, the locking plunger enters the registered openings to restrain axial displacement between the telescoping tubular members. When it is desired to vary the overall length of the telescoping tubular members, the lever actuating plunger is depressed to remove the locking plunger from the registered openings against the urgency of the spring and the telescoping tubular members are displaced axially relative to one another. The actuating plunger is released after the desired overall length for the telescoping tubular member is reached. Thereupon, one of the telescoping members is moved axially relative to the other tubular member until the locking plunger enters registered openings of the telescoping tubular members under the urgency of the spring to restrain axial displacement between the telescoping tubular members.

6 Claims, 2 Drawing Sheets

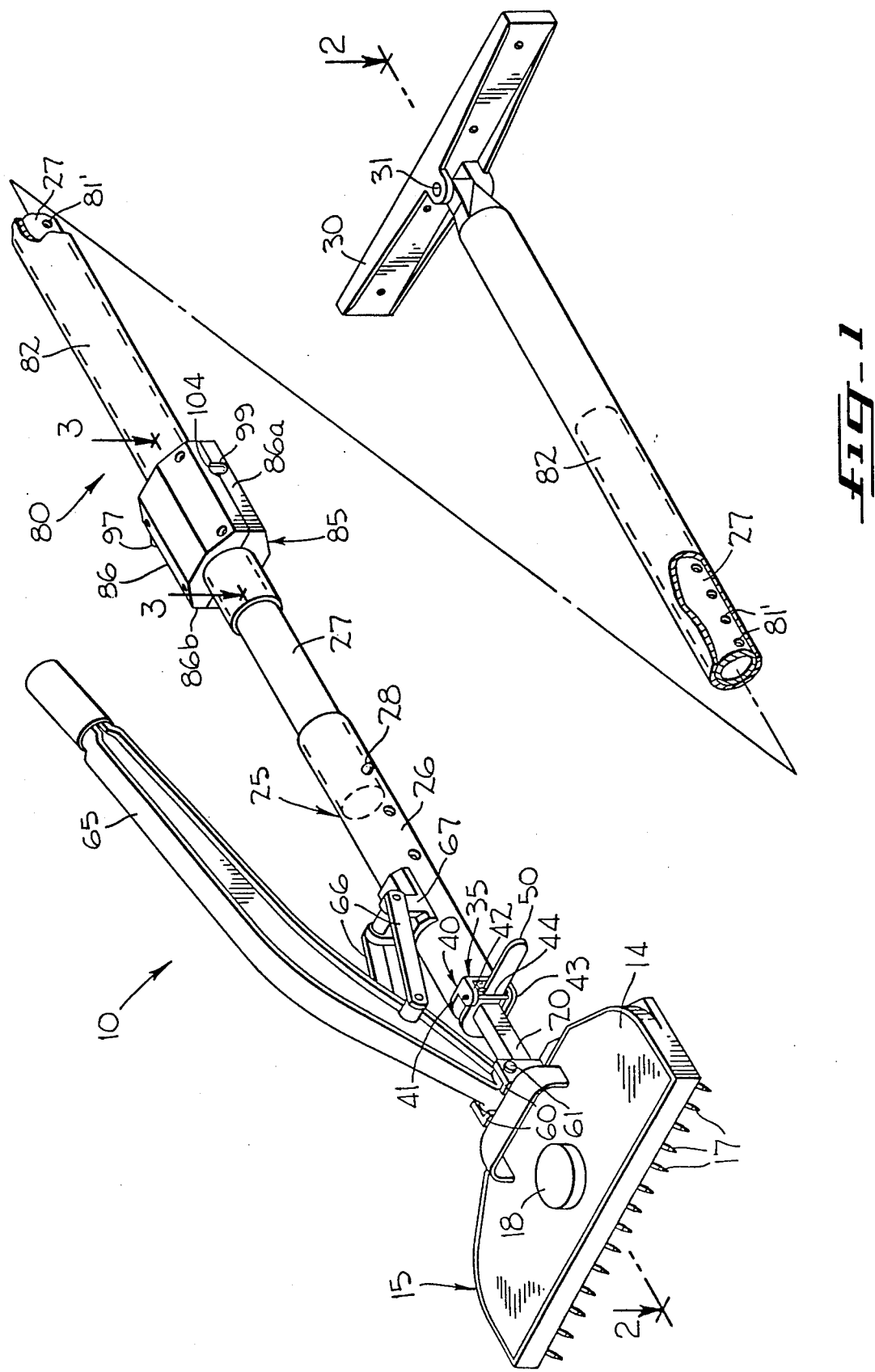

U.S. Patent  Jun. 19, 1990  Sheet 2 of 2  4,934,658
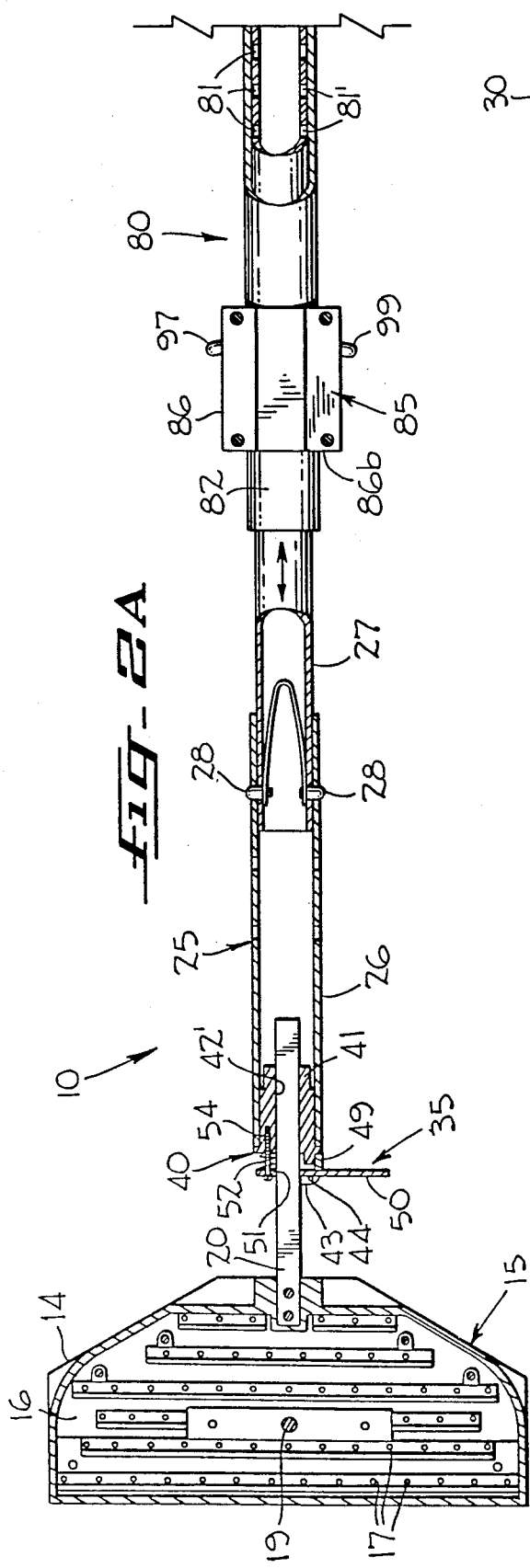
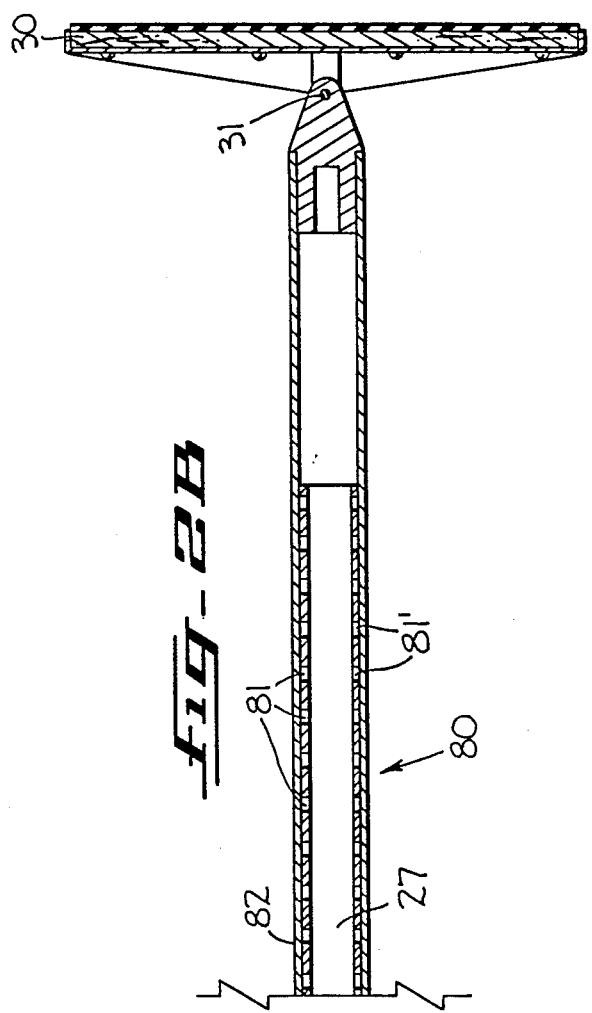
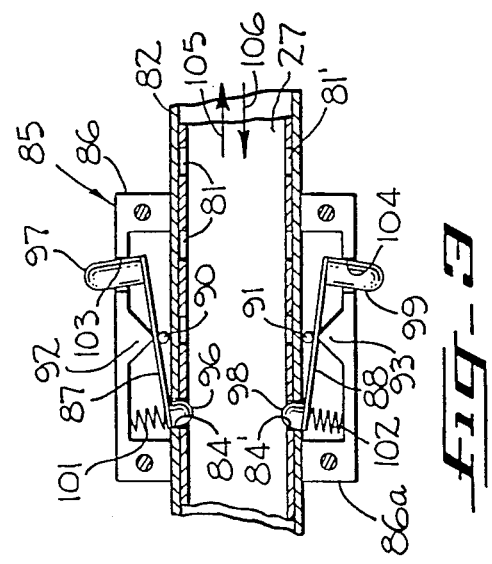

LOCKING MECHANISM FOR EXTENDIBLE TELESCOPING TUBULAR MEMBERS

RELATED CASE

This application is a divisional application of our copending application entitled A Locking Mechanism For Extendible Telescoping Tubular Members, Serial No. 06/635,574, filed on July 30, 1984 now U.S. Pat. No. 4,577,837.

BACKGROUND OF THE INVENTION

The present invention relates in general to a locking mechanism for telescoping tubular members, and more particularly to a locking mechanism for telescoping tubular members of a carpet stretcher.

Extendible and retractable telescoping tubular members have been employed for increasing or decreasing the length of carpet stretchers.

The patent to Crain, Jr., No. 4,230,302, issued on Oct. 28, 1980, for Carpet Stretcher, discloses a carpet stretcher with extendible, telescoping tubular members. The telescoping tubular members are axially displaceable relative to one another to control the overall length of the tubular members. Radial, axially aligned openings are formed in the telescoping tubular members. By registering radial openings of the telescoping tubular members, spring loaded plungers enter the registered openings to lock the telescoping tubular members in an adjusted position. The plungers are depressed against the urgency of the spring and the telescoping tubular members are moved axially until a desired adjusted length is reached. Then, the plungers are released and one of the telescoping tubular members is moved axially relative to the other tubular member until the plungers enter the registered openings to lock the telescoping tubular members.

The patent to Parsons, No. 493,111, issued on Mar. 7, 1983, for Piano Stool, discloses a locking mechanism for telescoping tubes in which there is a spring loaded lever. One end of the lever is a plunger that enters registered openings of telescoping tubes for locking the telescoping tubes in an adjusted position. At the other end of the lever is an actuating rod. The rod is actuated to retract the plunger from the aligned holes. A fulcrum for the lever is disposed midway between the ends thereof.

In the patent to Ream, No. 3,752,440, issued on Aug. 14, 1973, for Carpet Stretcher Pivot Bridge, there is disclosed oppositely directed plungers for entering registered openings of telescoping tubes for locking the tubes in adjusted positions relative to one another. The plungers are spring loaded. In one instance, a band-type spring is employed. In another instance, the plungers are mounted on opposite ends of a coil spring.

The patent to Payson, No. 4,076,213, issued on Feb. 28, 1973, for Locking Tube Assembly, discloses telescoping tubes. Disposed within a locking tube assembly is a locking collar that has a central aperture to receive an inner tube. A spring biases the collar to an oblique position relative to the axes for the telescoping tubes to lock the inner tube against retraction relative to an outer tube. The locking collar has a lug that projects through an axial slot in the axial tube and retains the outer tube in a fixed position with the locking collar. The locking collar has a lever oppositely located relative to the lug and projects through an axial slot in the outer tube. Actuation of the lever in the axial direction positions the locking collar releases the collar from locking engagement with the inner tube to enable the inner tube to be moved axially relative to the outer tube.

The patent to Stoll, No. 1,726,372, issued on Aug. 27, 1929, for Adjustable Chair, discloses telescoping tubes. A locking device for the telescoping tubes includes a locking lever that is spring loaded for engaging its end into registered openings of the tubes to lock the tubes in an adjusted position. The lever is located exteriorly of the telescoping tubes. A similar operating device is shown in the patent to Farren, No. 475,273, issued on May 17, 1892, for Road Cart.

In the patent to Richardson, No. 2,682,414, issued on June 29, 1954, for Longitudinally Adjustable Screw Driver, there is disclosed a handle movable relative to a tool shank. A spring loaded locking lever is pivotally mounted in the handle. At one end of the locking lever is a lug to enter an opening in the tool shank for locking the handle in an adjusted position on the tool shank. At the other end of the locking lever is an actuator shank that is depressed to remove the lug from the tool shank opening for moving the handle lengthwise along the tool shank.

SUMMARY OF THE INVENTION

A locking mechanism for extendible telescoping tubular members formed with radial, axially aligned openings. A hollow housing surrounds the exterior wall of the outer tubular member. Disposed within the hollow housing is at least one spring loaded lever. A locking plunger at one end of the lever projects out of the housing and enters registered openings of the telescoping tubular members to restrain axial displacement therebetween. an actuating plunger at the other end of the lever projects exteriorly of the housing and is oppositely directed relative to the locking plunger. By actuating the actuating plunger, the locking plunger is removed from the registered openings for enabling the telescoping tubular members to be displaced axially relative one another.

A feature of the present invention is that the locking plunger is disposed at an oblique angle relative to the axes of the telescoping tubular members, whereby the outer tubular member can be moved axially in one direction relative to the inner tubular member without the locking plunger providing any locking action. When the outer tubular member is moved in an opposite direction relative to the inner tubular member, the locking plunger penetrates registered radial openings in the telescoping tubular members for restraining the telescoping tubular members against axial displacement relative to one another.

An object of the present invention is to provide a locking mechanism for telescoping tubular members which is easy to operate.

Another object of the present invention is to provide a locking mechanism for telescoping tubular members that can be repaired without replacing defective parts or adjusting displaced parts within the telescoping tubular members.

Another object of the present invention is to provide a locking mechanism for telescoping tubular members which can be operated quickly and with facility.

DESCRIPTION OF THE DRAWINGS

FIG. 1 is a perspective view of a carpet stretcher embodying the present invention.

FIGS. 2 and 2B, when placed end-to-end, are a horizontal axial section view partially in elevation of the carpet stretcher shown in FIG. 1 taken along line 2—2 of FIG. 1.

FIG. 3 is an enlarged horizontal section view of a locking mechanism for the carpet stretcher shown in FIG. 1 taken along line 3—3 of FIG. 1.

DESCRIPTION OF THE PREFERRED EMBODIMENT

Illustrated in FIGS. 1 and 2 is a carpet stretcher 10 embodying the present invention. The carpet stretcher 10 comprises a pin head 15, which includes a suitable housing 14. Mounted in the housing 14 to be exposed to a carpet to be stretched is a horizontally disposed plate 16. Projecting from the plate 16 are carpet engaging pins 17, which penetrate the carpet to be engaged. The carpet engaging pins 17 are fixed to the plate 16 in a conventional and well-known manner. The height of the plate 16 is adjustable within the housing 14 in a well-known manner through a knob 18 that rotates a threaded post 19. The threaded post 19 is journalled for rotation by the housing 14. The plate 16 has an aperture surrounded by a threaded wall, which is in engagement with the threaded post 19 so that rotation of the post 19 varies the height of the plate 16 to vary the penetration of the carpet engaging teeth 17 with the carpet to be stretched.

Extending rearwardly from the rear wall of the housing 14 of the pin head 15 is a sliding bar 20, which has a rectangular cross-sectional area. In the exemplary embodiment, the bar 20 has a square cross-sectional area. The sliding bar 20 is freely received by a tubular extension assembly 25. The sliding bar 20 is disposed along the axis of the tubular extension assembly 25. In the preferred embodiment, the tubular extension assembly 25 comprises telescoping, extendible tubular members 26 and 27. The telescoping tubular members 26 and 27 are adjustable to control the insertion or retraction of the tubular member 27 within the tubular member 26. Toward this end, each of the tubular members 26 and 27 has radial apertures formed therein. By registering apertures of the tubular members for diametric alignment, spring loaded plungers 28 will be extended through aligned apertures to retain the tubular members in an adjusted position. Momentarily depressing the spring loaded plungers 28 and moving the tubular member 27 in the axial direction until another set of registering apertures are aligned will retain the tubular members in another adjusted position by the plungers 28 entering the aligned, registered openings.

At the free or rearward end of the carpet stretcher 10 is pivotally mounted a well-known and conventional wall engaging member 30. The wall engaging member 30 has a vertical wall to engage the base wall of a room to be carpeted and is pivotal about a vertically disposed pin 31 mounted on the rearward end of the carpet stretcher 10.

At the forward end of the tubular extension assembly 25 is mounted a conventional locking mechanism 35 for temporarily retaining or holding the sliding bar 20 in a fixed position relative to the tubular extension assembly 25 so that the pin head 15 will be temporarily retained at a selected distance from the wall engaging member 30 before being released. For this purpose, a right angular bracket 40 is fixed to the forwardmost end of the tubular extension assembly 25. The right angular bracket 40 includes a block 41 that extends transversely relative to the bar 20. Formed in the block 41 is an aperture 42' through which the sliding bar 20 is freely received. Integrally formed with the block 41 of the bracket 40 is an upstanding side plate 42 that extends in the axial direction parallel to and alongside of the sliding bar 20. A bottom plate 43 extends transversely to the sliding bar 20 and is integrally formed with the side plate 42. The bottom plate 43 serves to guard against tufts from the carpet getting into the operating parts of the locking mechanism 35.

A vertically disposed pin 44 extends between the plates 42 and 43. A holding or locking lever 50 is disposed transversely relative to the sliding bar 20. A face plate of the holding lever 50 is apertured at 51 to receive the sliding bar 20. The aperture 51 of the holding lever 50 is configured similarly to the cross-sectional area of the sliding bar 20, but is slightly larger than the cross-sectional area of the sliding bar 20. The holding lever 50 is retained for pivotal movement within the bracket 40 between a vertical plate 49 and the pin 44 and is pivotal about a vertical axis at a pivot point in the general direction relative to the sliding bar 20 and the tubular members 25 and 26. The plate 49 is bolted to the block 41. When the holding lever 50 is at right angles to the sliding bar 20, the sliding bar 20 is freely movable within the aperture 51. When the holding lever 50 is pivoted away from the right angular position, the walls surrounding the aperture 51, in the exemplary embodiment, move rearwardly to grip the walls of the sliding bar 20 to lock or hold the sliding bar 20 in a fixed position relative to the tubular member 26. A suitable spring 52 between the holding lever 50 and the transverse plate 41 of the bracket 40 urges the lever 50 in the position to disengage the sliding bar 20 and to permit the sliding bar 20 to be freely movable. The spring 52 is received by the lever 50. The spring 52 is disposed between the block 41 and the lever 50.

At the rearward wall of the pin head housing 14 are upstanding ears 60. Pivotally attached to the pin head housing 14 through the upstanding ears 60 and a shaft 61 is a handle 65. Parallel links 66 are pivotally connected to the handle 65 and a bracket 67 that is fixed to the tubular member 26.

The wall engaging member 30 is placed against a suitable wall and the pin head 15 is placed in engagement with carpet to be stretched. The handle 65 is an elevated position. The operator depresses the handle 65 until the carpet is stretched to a desired extent through the pin head 15. In stretching the carpet, an axial force is applied to the carpet via the pin head 15. After the carpet is stretched to the desired extent, the operator pivots the lever 50 about the vertical axis of the plate 49 so that the lever 50 engages the sliding bar 20 at the points 46 and 47.

When a carpet is stretched, the carpet produces an axial reactive force. By pivoting the lever 50 about the vertical axis of the plate 49 to engage the lever 50 with the sliding bar 20, the lever 50 retains the sliding bar 20 in the extended carpet stretch position against the axial reactive force produced by the stretched carpet. In so doing, the pin head 15 is held in the carpet stretching position against the axial reactive force produced by the stretched carpet. The greater the axial reactive force, the greater the locking force between the lever 50 and the sliding bar 20.

Subsequently, the operator depresses the handle 65 to release the axially reactive force and to enable the return of the locking lever 50 to the position at right angles to the sliding bar 20. When so positioned, the lever 50 is not in locking engagement with the sliding bar 20. The spring 52 continuously urges the lever 50 to be positioned at right angles to the sliding bar 20.

The foregoing has been described and shown in detail in the patent to Millard Crain, Jr., No. 4,230,302, issued on Oct. 28, 1980, for Carpet Stretcher.

According to the present invention, a tubular extension assembly 80 comprises the inner tubular member 27 formed with a plurality of radial, axially aligned sets of openings 81 and 81'. The sets of openings 81 and 81' are diametrically opposite from one another. An outer tubular member 82 and the inner tubular member 27 are telescoping tubular members movable in the axial direction relative to one another. Formed in the outer tubular member 82 are radial openings 84 and 84', which are located diametrically opposite from one another. The pin 31 is mounted on the outer tubular member 82 at the rear of the tubular extension assembly 80.

Surrounding the outer tubular member 82 is a locking mechanism 85, which comprises a hollow housing 86 formed from contiguous or juxtaposed sections 86a and 86b. The separable, juxtaposed sections 86a and 86b are secured together by nuts and bolts. Disposed within the hollow housing 86 are levers 87 and 88 (FIG. 3). Pins 90 and 91 are fixedly secured within the housing 86 and project upwardly so that a plane passing through the axes thereof is perpendicular to the axes of the telescoping tubular members 27 and 82. The pins 90 and 91, respectively, provide a fulcrum for the pivotal movements of the levers 87 and 88.

Oppositely located from the pins 90 and 91 within the housing 86 are blocks 92 and 93 of substantially triangular cross-sectional areas. The blocks 92 and 93 are integrally formed with the housing 86 and the apices thereof are directed toward the pins 90 and 91, respectively. The lever 87 is a flat member disposed between the pin 90 and the block 92. The axial direction of the pin 90 and the apex of the block 92 extend transversely across the lever 87. Similarly, the lever 88 is a flat member disposed between the pin 91 and the block 93. The axial direction of the pin 91 and the apex of the block 93 extend transversely across the lever 88.

At the end sections of the lever 87 are oppositely directed plungers 96 and 97. At the end sections of the lever 88 are oppositely directed plungers 98 and 99. When the telescoping tubular members 27 and 82 are restrained from axial displacement relative to one another, the locking plunger 96 projects out of the housing 86 and is disposed within registered openings 81 and 84 and the locking plunger 98 projects out of the housing 86 and is disposed within registered openings 81' and 84'. Interposed between the lever 87 and the housing 86 is a tension spring 101 which urges the locking plunger 96 to maintain the locking engagement between the telescoping tubular members 27 and 82. Interposed between the lever 88 and the housing 86 is a tension spring 102 which urges the locking plunger 98 to maintain locking engagement between the telescoping tubular members 27 and 82. The lever actuating plunger 97 projects exteriorly of the housing 86 through an opening 103 formed in the housing 86. In a similar manner, the lever actuating plunger 99 projects exteriorly of the housing 86 through an opening 104 formed in the housing 86. By actuating the plungers 97 and 99 inwardly toward the axes of the telescoping tubular members 27 and 82, the levers 87 and 88 pivot in a direction to retract the locking plungers 96 and 98 into the housing 86.

At that time, the telescoping tubular members 27 and 82 are free for displacement relative to one another. When a desired axial displacement between the telescoping tubular members 27 and 82 is reached, the lever actuating plungers 97 and 99 are released. When the openings 81 and 84 and the openings 81' and 84' register, the locking plungers 96 and 98 will enter the associated registered openings 81 and 84 and 81' and 84' to restrain relative axial displacement between the telescoping tubular members 27 and 82 and to lock the telescoping tubular members 27 and 82 in the adjusted position.

The locking plungers 96 and 98 are obliquely disposed relative to the axes of the tubular members 27 and 82. The locking plungers 96 and 98 are directed in a direction indicated by an arrow 105 (FIG. 3). When the outer tubular member 82 is displaced axially in the direction of the arrow 105 relative to the inner tubular member 27, the plungers 96 and 98 will not enter the openings 81 and 84 and the openings 81' and 84', but will advance thereover. However, when the outer tubular member 82 is displaced axially relative to the inner tubular member 27 in the direction of an arrow 106 (FIG. 3), the locking plungers 96 and 98 will enter associated registered openings 81 and 84 and 81' and 84' to restrain further axial movement of the outer tubular member 82 relative to the inner tubular member 27.

While the locking mechanism 85 illustrates, in the preferred embodiment, two similar devices within the housing 86, it is apparent that a single locking device may be employed without departing from the spirit of the present invention.

We claim:

1. A locking mechanism for inner and outer telescoping tubular members formed with axially aligned, radial openings, said locking mechanism comprising:
   (a) a hollow housing surrounding the outer tubular member;
   (b) a lever mounted for pivotal movement within said housing;
   (c) oppositely directed locking plunger and lever actuating plunger mounted directly on opposite end sections of said lever, said locking plunger projecting out of said housing and entering registering openings in said inner and outer telescoping tubular members for restraining relative axial displacement between said inner and outer telescoping tubular members, said actuating plunger being disposed within said housing and projecting out of said housing and actuated to remove said locking plunger from registering openings in said inner and outer tubular members for relative axial displacement between said inner and outer telescoping tubular members; and
   (d) a spring disposed within said housing and connected to said lever for urging said locking plunger to remain in entered registering openings, the actuation of said actuating plunger to remove said locking plunger from registering openings being against the urgency of said spring,
   (e) said housing including means for guiding said actuating plunger during the actuation thereof.

2. A locking mechanism as claimed in claim 1 wherein said hollow housing comprises detachably secured housing sections.

3. A locking mechanism as claimed in claim 1 wherein said locking plunger is obliquely disposed relative to the axes of said telescoping tubular members for entering registering openings in said inner and outer tubular members when there is relative displacement between said tubular members in one axial direction for restraining relative axial displacement between said telescoping tubular members and for advancing over registering openings in said inner and outer tubular members where there is relative axial displacement between said tubular members in an opposite direction.

4. A carpet stretcher comprising:
   A. a pin head;
   B. a wall engaging member spaced from said pin head in the longitudinal direction;
   C. tubular assembly means interconnecting said pin head and said wall engaging member, said tubular assembly means comprising inner and outer telescoping tubular members formed with axially aligned, radial openings;
   D. handle linkage means interconnecting said pin head and said tubular assembly means for applying a stretching force to a carpet; and
   E. a locking mechanism for restraining said inner and outer tubular members against axial displacement relative to one another comprising:
      a. a hollow housing surrounding the outer tubular member,
      b. a lever mounted for pivotal movement within said housing, and
      c. oppositely directed locking plunger and lever actuating plunger mounted directly on opposite end sections of said lever, said locking plunger being disposed within said housing and projecting out of said housing and entering registering openings in said inner and outer telescoping tubular members for restraining relative axial displacement between said inner and outer telescoping tubular members, said actuating plunger being disposed within said housing and projecting out of said housing and actuated to remove said locking plunger from registering openings in said inner and outer tubular members for enabling relative axial displacement between said inner and outer telescoping tubular members, and
      d. a spring disposed within said housing and connected to said lever for urging said locking plunger to remain in entered registering openings, the actuation of said actuating plunger to remove said locking plunger from registering openings being against the urgency of said spring,
      e. said housing including means for guiding said actuating plunger during the actuation thereof.

5. A carpet stretcher as claimed in claim 4 wherein said hollow housing comprises detachably secured housing sections.

6. A carpet stretcher as claimed in claim 4 wherein said locking plunger is obliquely disposed relative to the axes of said telescoping tubular members for entering registering openings in said inner and outer tubular members when there is relative displacement between said tubular members in one axial direction for restraining relative axial displacement between said telescoping tubular members and for advancing over registering openings in said inner and outer tubular members where there is relative axial displacement between said tubular members in an opposite direction.

* * * * *